(12) United States Patent
Spire

(10) Patent No.: US 8,615,252 B2
(45) Date of Patent: Dec. 24, 2013

(54) COLLAR TRACKING SYSTEM

(76) Inventor: Brian Spire, Woodland Hills, CA (US)

( * ) Notice: Subject to any disclaimer, the term of this patent is extended or adjusted under 35 U.S.C. 154(b) by 59 days.

(21) Appl. No.: 13/114,430

(22) Filed: May 24, 2011

(65) Prior Publication Data

US 2011/0287780 A1    Nov. 24, 2011

Related U.S. Application Data

(60) Provisional application No. 61/347,808, filed on May 24, 2010.

(51) Int. Cl.
*H04W 24/00* (2009.01)
(52) U.S. Cl.
USPC ............... 455/456.1; 455/456.3; 455/440; 455/457
(58) Field of Classification Search
USPC ............... 455/456.1, 456.3, 440, 457
See application file for complete search history.

(56) References Cited

U.S. PATENT DOCUMENTS

| 6,922,566 | B2 * | 7/2005 | Puranik et al. | 455/456.2 |
|---|---|---|---|---|
| 7,772,978 | B1 * | 8/2010 | Somogyi et al. | 340/572.4 |
| 7,861,676 | B2 * | 1/2011 | Kates | 119/720 |
| 2004/0130442 | A1 * | 7/2004 | Breed et al. | 340/443 |
| 2005/0184757 | A1 * | 8/2005 | Skroch | 326/63 |
| 2006/0197672 | A1 * | 9/2006 | Talamas et al. | 340/573.3 |
| 2008/0272908 | A1 * | 11/2008 | Boyd | 340/539.13 |
| 2009/0002188 | A1 * | 1/2009 | Greenberg | 340/686.1 |
| 2009/0306730 | A1 * | 12/2009 | Roso | 607/5 |
| 2009/0315767 | A1 * | 12/2009 | Scalisi et al. | 342/357.07 |

* cited by examiner

*Primary Examiner* — Charles Appiah
*Assistant Examiner* — Edward Zhang
(74) *Attorney, Agent, or Firm* — Michael Ries

(57) ABSTRACT

The present invention is a collar tracking system that includes a RFID system with a modem, an electric fence with a plurality of boundaries that is in communication with the RFID system and a plurality of power modes, a plurality of electronic circuitry that includes a battery, an open charging electrode, a smart protection circuitry to prevent a short to the battery and an antenna. The collar tracking system also includes a GSM system that is in communication with the electric fence and the RFID system, a collar with a RFID receiver and a GMS receiver that is in communication with the RFID system and the GMS system and overall system software that controls the RFID system, the electric fence, the electric circuitry, the GMS system, the RFID receiver and the GMS receiver. The collar tracking system can also utilize a GPS system to replace the RFID system.

14 Claims, 2 Drawing Sheets

COLLAR TRACKING SYSTEM

This application claims priority to U.S. Provisional Application 61/347,808 filed on May 24, 2010, the entire disclosure of which is incorporated by reference.

TECHNICAL FIELD & BACKGROUND

With technology advancements regarding global positioning satellite or GPS systems and cellular phone and/or mobile to mobile or M2M devices, a relatively small practical real time collar tracking system can potentially be developed for pet, human and asset tracking. Currently all the related products for collar tracking systems lack two basic features. The collar tracking systems are either relatively too bulky and cumbersome for a pet, other user or object to utilize or the system cannot last a relatively long enough period of time to become practical.

It is an object of the present invention to provide a collar tracking system that can be utilized on pets and other animals.

It is an object of the present invention to provide a collar tracking system that utilizes cellular technology or GPS technology to notify a user with a cell phone or mobile to mobile or M2M device.

It is an object of the present invention to provide a collar tracking system that utilizes an electronic fence that utilizes GPS coordination or radio frequency identification or RFID technology.

What is really needed is a collar tracking system that can be utilized on pets and other animals that utilizes cellular technology or GPS technology to notify a user with a cell phone or M2M device and that utilizes an electronic fence that utilizes GPS coordination or RFID technology.

BRIEF DESCRIPTION OF THE DRAWINGS

The present invention will be described by way of exemplary embodiments, but not limitations, illustrated in the accompanying drawing in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

Figure 1A:
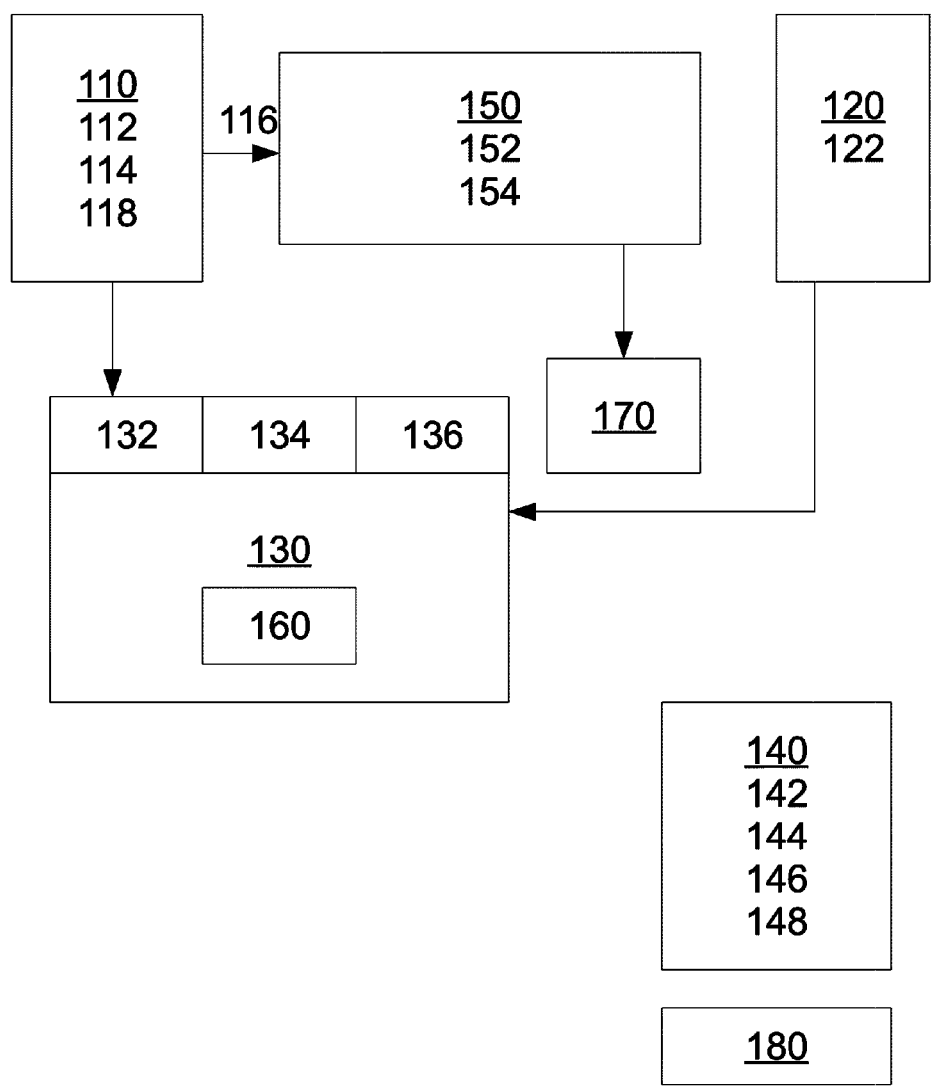
FIG. 1A illustrates a block diagram of a system overview of a collar tracking system, in accordance with one embodiment of the present invention.

FIG. 1A illustrates a block diagram of a system overview of a collar tracking system 100, in accordance with one embodiment of the present invention. The collar tracking system 100 includes a global positioning satellite or GPS system 110 or a radio frequency identification or RFID system 120, an electric fence 130, a plurality of electronic circuitry 140, a global system for mobile communication or GSM system 150, a collar 160, a cell phone or mobile to mobile or M2M device 170 and overall system software 180. The collar tracking system 100 can utilize either the GPS system 110 or the RFID system 120.

The GPS system 110 includes a modem 112 and sets a plurality of boundaries for the electric fence 130. The GPS system 110 can be a GPS PVT system 114 or any other suitable GPS system. There are separate functional GPS system 110 and GSM system 150 modem modules that are separated into functional blocks. They are interconnected to each other via a flexible printed circuit or FPC 116. The RFID system 120 can also be utilized to set the boundaries for the electric fence 130. The RFID system 120 can be a RFID ISM 122 system, although other suitable RFID systems can be utilized. The electric fence 130 utilizes either GPS coordination 118 from the GPS system 110 or the RFID ISM system 120 to provide the electric fence 130 with a customer configurable range. The electric fence 130 can be implemented utilizing the GPS system 110 with a relatively larger range and less accuracy in an environment where open sky is not available. The RFID ISM system 120 utilizes a received signal strength indicator or RSSI technique 122 to establish the electric fence 130 protection and its boundaries. The electric fence 130 utilizes an optimized power saving scheme and three different power operation modes. The modes include a deep sleep mode 132 with a short message service or SMS trigger that works up to 12 to 15 days depending on battery size, a GSM sleep and a GPS trigger mode 134 with adjustable wake up intervals that work up to 6 to 8 days depending on battery size and an active track mode 136 that works up to 2 or more days depending on battery size.

The electronic circuitry 140 includes a battery 142 that is fabricated into the collar 160 with an open charging electrode 144 to reduce cost. A smart protection circuitry 146 is implemented to prevent a short to the battery 142. An arrangement of an antenna 148 for both the GPS system 110 and the GSM system 150 is implemented in such a way that a preferred position is preserved. The relatively sensitive electronic circuitry 140 is provided to guarantee that the GPS system 110 is capable of tracking in an awkward and/or indoor environment.

The GSM system 150 includes a GSM modem 152 and can utilize general packet radio service or GPRS technology 154 or global system for mobile communication or GSMC technology to communicate with a cell phone or M2M device 170 to notify a user if a pet wearing the collar 160 has gone outside the electric fence 130. As previously indicated, the GSM system 150 and GPS system 110 are interconnected to each other via a flexible printed circuit or FPC 116. As soon as the pet wearing the collar 160 is outside of the electric fence 130, the GSM modem 152 is activated and transmits a message or SMS to a user cell phone or M2M device 170, website or e-mail.

Figure 1B:
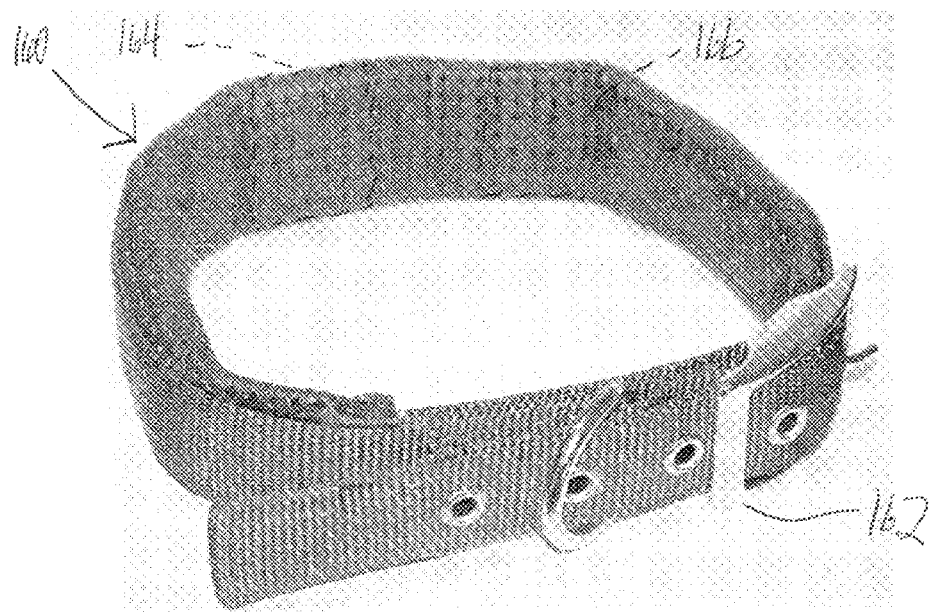
FIG. 1B illustrates an overhead front perspective view of a pet collar of a collar tracking system, in accordance with one embodiment of the present invention.

The collar 160 is relatively slim and flexible and is described in greater detail in FIG. 1B and its description. The cell phone or M2M device 170 can be any suitable cell phone or M2M device in communication with the collar tracking system 100 and its components. M2M device can include smartphones, personal digital assistants or PDAs, or any type of computer in communication with the collar tracking system. The overall software 180 controls the GPS system 110 and modem 112, the RFID system 120, the electric fence 130, the electronic circuitry 140, the GSM system 150 and modem 152, and the cell phone or mobile to mobile or M2M device 170 and their respective components.

FIG. 1B illustrates an overhead front perspective view of a collar 160 of a collar tracking system 100, in accordance with one embodiment of the present invention. The collar 160 can be worn by a pet, animal or person or can be secured around an asset or other object. The collar 160 has an inconspicuous slim design where relatively very small components are utilized in combination with the collar tracking system 100. The collar 160 is made of any suitable flexible and waterproof material. The collar 160 utilizes a buckle fastener 162 to secure the collar 160 around a pet, animal or other user or object, although other suitable fasteners such as a hook and loop fastener can also be used. The collar 160 has a GPS receiver 164 disposed inside of or within the collar 160 that is in communication with the GPS system 110 that indicates when the pet wearing the collar 160 is outside the electric fence 130. The GPS receiver 164 is relatively very small to eliminate bulkiness and size. The collar 160 also has a GSM receiver 166 disposed inside of or within the collar 160 that is in communication with the GSM system 150 that indicates when the pet wearing the collar 160 is outside the electric fence 130. The previously described components disposed inside of or within the collar 160 are in contrast to other similar collars that utilize a box (not shown) with similar components contained in the box. These previously described components are not visible from the exterior of the collar 160. The previously described components can however, be disposed outside of the collar 160 as well in a box or other suitable casing.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A collar tracking system, comprising:
   a GPS system with a modem;
   an electric fence with a plurality of boundaries, wherein said electric fence is in communication with said GPS system and a plurality of power modes; wherein said power modes include a deep sleep mode with a SMS trigger that works up to in the range of 12 to 15 days; a GSM sleep and a GPS trigger mode with a plurality of adjustable wake up intervals that work up to in the range of 6 to 8 days; and an active track mode that works up to 2 or more days depending on battery size;
   a plurality of electronic circuitry that includes a battery, an open charging electrode, a smart protection circuitry to prevent a short to said battery and an antenna;
   a GSM system being in communication with said electric fence and said GPS system;
   the collar comprising a GPS receiver and a GSM receiver disposed inside of or within said collar that is in communication with said GPS system and said GSM system; wherein,
   when the collar has gone outside of the electric fence, the GSM modem is activated and transmits a message or SMS to a user cell phone or M2M (mobile-to-mobile) device; and
   a software system that controls said GPS system, said electric fence, said plurality of electronic circuitry, said GSM system, said GPS receiver and said GSM receiver.

2. The system according to claim 1, wherein said GPS system sets said electric fence boundaries.

3. The system according to claim 2, wherein said GPS system is a GPS PVT system.

4. The system according to claim 1, wherein said GSM system utilizes GPRS technology to communicate with said cell phone or M2M device.

5. The system according to claim 1, wherein said GSM system utilizes GSM technology to communicate with said cell phone or M2M device.

6. The system according to claim 1, wherein said GSM system and said GPS system are interconnected by a FPC.

7. The system according to claim 1, wherein said GSM system notifies said cell phone or M2M device when said collar is outside of said electric fence.

8. A collar tracking system, comprising:
   a RFID system with a modem;
   an electric fence with a plurality of boundaries, wherein said electric fence is in communication with said RFID system and a plurality of power modes, wherein said power modes include a deep sleep mode with a SMS trigger that works up to in the range of 12 to 15 days; a GSM sleep and a GPS trigger mode with a plurality of adjustable wake up intervals that work up to in the range of 6 to 8 days; and an active track mode that works up to 2 or more days depending on battery size;
   a plurality of electronic circuitry that includes a battery, an open charging electrode, a smart protection circuitry to prevent a short to said battery and an antenna;
   a GSM system that is in communication with said electric fence and said RFID system;
   the collar comprising a RFID receiver and a GSM receiver disposed inside of or within said collar that is in communication with said RFID system and said GSM system; wherein,
   when the collar has gone outside of the electric fence, the GSM modem is activated and transmits a message or SMS to a user cell phone or M2M (mobile-to-mobile) device;
   a software system that controls said RFID system, said electric fence, said electric circuitry, said GSM system, said RFID receiver and said GSM receiver.

9. The system according to claim 8, wherein said RFID system sets said electric fence boundaries.

10. The system according to claim 9, wherein said RFID system is a RFID ISM system that utilizes a RSSI technique to establish electric fence protection and said boundaries.

11. The system according to claim 8, wherein said GSM system utilizes GPRS technology to communicate with said cell phone or M2M device.

12. The system according to claim 8, wherein said GSM system utilizes GSM technology to communicate with said cell phone or M2M device.

13. The system according to claim 8, wherein said GSM system and said RFID system are interconnected by a FPC.

14. The system according to claim 8, wherein said GSM system notifies said cell phone or M2M device when said collar is outside of said electric fence.

\* \* \* \* \*